(12) United States Patent
Charpentier et al.

(10) Patent No.: US 11,025,302 B2
(45) Date of Patent: Jun. 1, 2021

(54) ACCURATE END OF PAUSE-A DETECTION FOR NEAR FIELD COMMUNICATIONS

(71) Applicant: NXP B.V., Eindhoven (NL)

(72) Inventors: Steve Charpentier, Antibes (FR); Stefan Mendel, Graz (AT); Ulrich Andreas Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/849,062

(22) Filed: Apr. 15, 2020

(65) Prior Publication Data
US 2020/0358479 A1 Nov. 12, 2020

(30) Foreign Application Priority Data
May 9, 2019 (EP) ..................................... 19305592

(51) Int. Cl.
*H04B 5/00* (2006.01)

(52) U.S. Cl.
CPC .................................. *H04B 5/0031* (2013.01)

(58) Field of Classification Search
CPC ...... H04B 5/0031; H04B 5/0025; H04B 5/02; H04W 4/80; H04W 76/30
USPC ........................................................ 455/41.1
See application file for complete search history.

(56) References Cited

U.S. PATENT DOCUMENTS

| 9,680,461 | B1* | 6/2017 | Singh ....................... H04B 1/16 |
| 2010/0315160 | A1 | 12/2010 | Sbuell et al. |
| 2015/0207616 | A1 | 7/2015 | Choke et al. |
| 2015/0318945 | A1* | 11/2015 | Abdelmonem ....... H04L 5/0023 |
| | | | 370/329 |

OTHER PUBLICATIONS

BSI Standards Publication; BS ISO/IEC 14443-2:2016; "Identification cards—Contactless integrated circuit cards—Proximity cards, Part 2: Radio frequency power and signal interface," Third edition Jul. 15, 2016.

* cited by examiner

*Primary Examiner* — Eugene Yun

(57) ABSTRACT

A contactless communication device includes a near field communication (NFC) module for generating an electromagnetic carrier signal and modulating the carrier signal according to data to be transmitted, and an antenna coupled to and driven by said NFC module with the modulated carrier signal. The device includes an RF front end coupled between said NFC module and said antenna and further includes a detection module coupled to said NFC module for detecting an end of a PauseA of an incoming RF signal by monitoring an amplitude of a digital output signal derived from the incoming RF signal. The detection module detects the PauseA in said digital output signal by comparing the amplitude of said output digital signal to a first level. The detection module further detects the end of the PauseA in said digital output signal by comparing the amplitude of said digital output signal to a second level.

8 Claims, 2 Drawing Sheets

ACCURATE END OF PAUSE-A DETECTION FOR NEAR FIELD COMMUNICATIONS

CROSS-REFERENCE TO RELATED APPLICATIONS

This application claims priority under 35 U.S.C. § 119 to European Patent Application No. 19305592.8, filed on May 9, 2019, the contents of which are incorporated by reference herein.

The present disclosure generally relates to contactless communication, in particular to the end of PauseA detection for near field communications (NFC).

NFC is a form of contactless communication between devices like smartphones or tablets. NFC devices can operate in three different modes based on ISO/IEC 18092, NFC IP-1 and ISO/IEC 14443 contactless smart card standards. In the read/write mode, an NFC device can read or write data to any of the supported tag types in a standard NFC data format. In the Peer-to-Peer (P2P) mode, two NFC devices can exchange data such as virtual business cards or digital photos. You can also share Bluetooth or Wi-Fi link set up parameters to initiate a Bluetooth or Wi-Fi link in the P2P mode. P2P mode is standardized in the ISO/IEC 18092 standard. In the card emulation mode, NFC devices can act as a virtual version of any plastic card that conforms to the core international standard for contactless smart cards, ISO/IEC 14443 A/B (also known as ISO 14443 Type A and Type B). NFC devices can also provide support for Sony's FeliCa contactless card technology, which is widely used in Japan for both contactless card payments and for mobile payments.

According to the ISO/IEC 14443 standard, the PICC (proximity integrated circuit card) shall detect the end of PauseA (PauseA is defined in ISO/IEC 14443 as PCD "proximity coupling device" modulation pulse, Type A) after the field exceeds 5% of Hinitial and before it exceeds 60% of Hinitial (Hinitial is defined in ISO/IEC 14443 as the field strength of the unmodulated RF field). FIG. 1 shows the definition of the end of PauseA for a bit rate of fc/128 (~106 kbit/s) as defined in the ISO/IEC 14443 standard.

During NFC communications, it is important to be able to accurately detect the end of the last PauseA in a data frame received by the receiver unit of an NFC device. The end of the last PauseA in a received data frame indicates the start of the frame delay time before the next transmission. However, the variety of shapes of a PauseA received in a data frame can sometimes make it difficult to accurately detect the end of the PauseA. As such, it would likely cause incorrect frame delay time to be used between reception and transmission during the communications.

SUMMARY

A device for contactless communication includes an NFC module being adapted to generate an electromagnetic carrier signal and to modulate the carrier signal according to data to be transmitted; an antenna coupled to and driven by said NFC module with the modulated carrier signal; and an RF front end coupled between said NFC module and said antenna. Said device further includes a detection module coupled to said NFC module for detecting an end of a PauseA of an incoming RF signal by monitoring an amplitude of a digital signal derived from the incoming RF signal. The detection module detects the PauseA in said digital signal by comparing the amplitude of said digital signal to a first level. The detection module further detects the end of the PauseA in said digital signal by comparing the amplitude of said digital signal to a second level.

In one embodiment, the PauseA is detected in said digital signal if the amplitude of said digital signal is less than said first level.

In one embodiment, said first level equals Hinitial times a threshold.

In one embodiment, said threshold is first set to an initial threshold.

In one embodiment, said threshold is decreased by a first amount if the amplitude of said digital signal is less than Hinitial times (the threshold−5%) and said threshold is greater than 5%.

In one embodiment, said first amount equals 5%.

In one embodiment, the end of the PauseA is detected in said digital signal if the amplitude of said digital signal is greater than said second level.

In one embodiment, said second level equals Hinitial times 85%.

In one embodiment, said RF front end includes one or more analog-to-digital converters (ADC, A/D, or A-to-D) for converting the incoming RF signal to an in-phase digital signal and a quadrature digital signal.

In one embodiment, said detection module further includes a combiner circuit, wherein said combiner circuit is adapted to combine the in-phase digital signal and the quadrature digital signal to generate said digital signal.

A method for detecting an end of a PauseA for near field communications (NFC) includes receiving an incoming RF signal; generating an in-phase signal and a quadrature signal from the incoming RF signal; combining the in-phase signal and the quadrature signal to generate a digital output signal; and detecting an end of a PauseA of said incoming RF signal by monitoring an amplitude of said digital output signal. Said detecting an end of a PauseA of said incoming RF signal includes detecting the PauseA in said digital output signal by comparing the amplitude of said digital output signal to a first level; and detecting the end of the PauseA in said digital output signal by comparing the amplitude of said digital output signal to a second level.

In one embodiment, the method detects the PauseA in said digital output signal if the amplitude of said digital output signal is less than said first level.

In one embodiment, said first level equals Hinitial times a threshold.

In one embodiment, the method further includes decreasing said threshold by a first amount if the amplitude of said digital output signal is less than Hinitial times (the threshold−5%) and the threshold is greater than 5%.

In one embodiment, the method detects the end of the PauseA in said digital output signal if the amplitude of said digital output signal is greater than said second level.

The above discussion is not intended to represent every example embodiment or every implementation within the scope of the current or future Claim sets.

Various example embodiments may be more completely understood in consideration of the following Detailed Description in connection with the accompanying Drawings.

Figure 1:
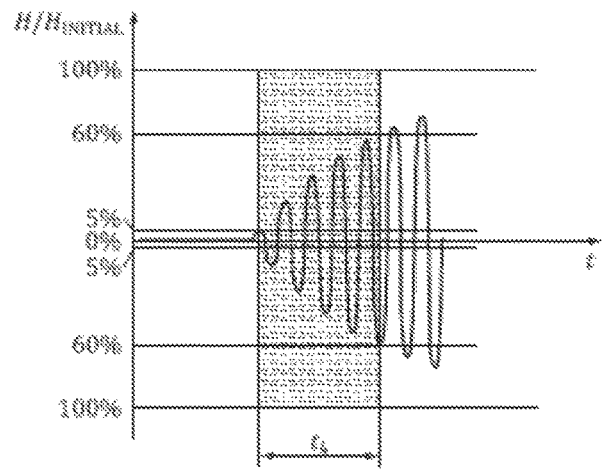
FIG. 1 shows the definition of the end of PauseA as defined in the ISO/IEC 14443 standard.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Figure 2:
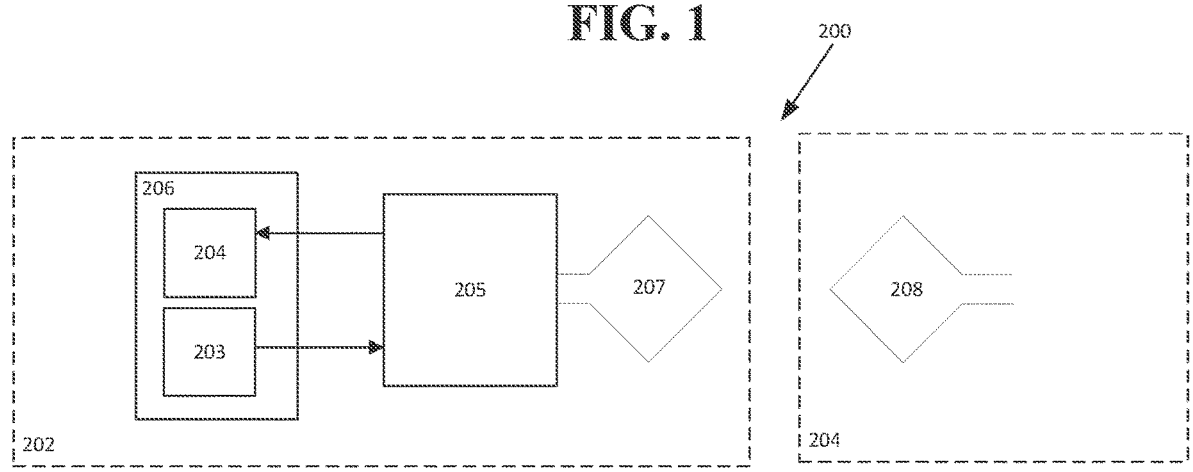
FIG. 2 is an inductively coupled communication system.

FIG. 2 depicts an inductively coupled communication system. Communication system 200 may include a first communication device 202 and a second communication device 204. Communication device 202 and communication device 204 communicate with each other using inductively coupled communication. For example, the inductively coupled communication may be NFC. Examples of communication devices include wireless communication devices, cellular phones, smartphones, tablet devices, voice recorders, digital cameras, still cameras, camcorders, gaming systems, laptop computers, etc.

In inductively coupled communication, the first device 202 may generate an electromagnetic field to which the second device 204 may be coupled. For example, in the case of NFC, the direction for the data flow may be characterized by having the first device 202 (also referred to as a polling device, proximity coupling device (PCD), reader or initiator) provide the electromagnetic field. The second device 204 (also referred to as a listener, listening device, proximity integrated circuit card (PICC), tag or target) may communicate with the first device 202 by generating modulation content.

As depicted in FIG. 2, the first device 202 may include a transmitter 203 and a receiver 204. The transmitter and receiver may be part of an NFC module 206. The first device 202 may further include an RF or analog front-end module 205 and an antenna 207. The second device 204 may include an antenna 208, which is inductively coupled to the antenna 207.

Figure 3:
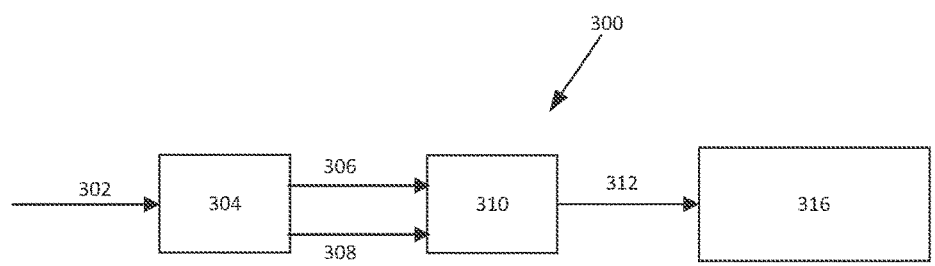
FIG. 3 is a schematic diagram illustrating the end of the PauseA detection according to an embodiment of the present invention.

FIG. 3 is a schematic diagram illustrating the end of the PauseA detection according to an embodiment of the present invention. In one embodiment, the schematic of FIG. 3 is implemented in the communication devices of FIG. 2, e.g., communication device 202.

As shown in FIG. 3, an incoming RF signal 302 is received by an analog front end 304. In one embodiment, the analog front end 304 includes one or more analog-to-digital converters (ADC, A/D, or A-to-D) for converting the incoming signal to an in-phase digital signal 306 and a quadrature digital signal 308. The in-phase and quadrature digital signals are output by the analog front end 304.

As depicted in FIG. 3, schematic 300 may also include an IQ combiner 310, which receives the in-phase digital signal 306 and the quadrature digital signal 308 from the analog front end 304 and combines the in-phase and quadrature digital signals to generate a digital signal 312 at the output of the IQ combiner. The digital output signal 312 is provided to a detection block 316 for detecting the end of the PauseA in the received digital output signal. In one embodiment, an adaptive threshold algorithm is implemented in detection block 316 for detecting the end of the PauseA in the digital output signal 312. This will be explained in detail with reference to FIG. 4.

Figure 4:
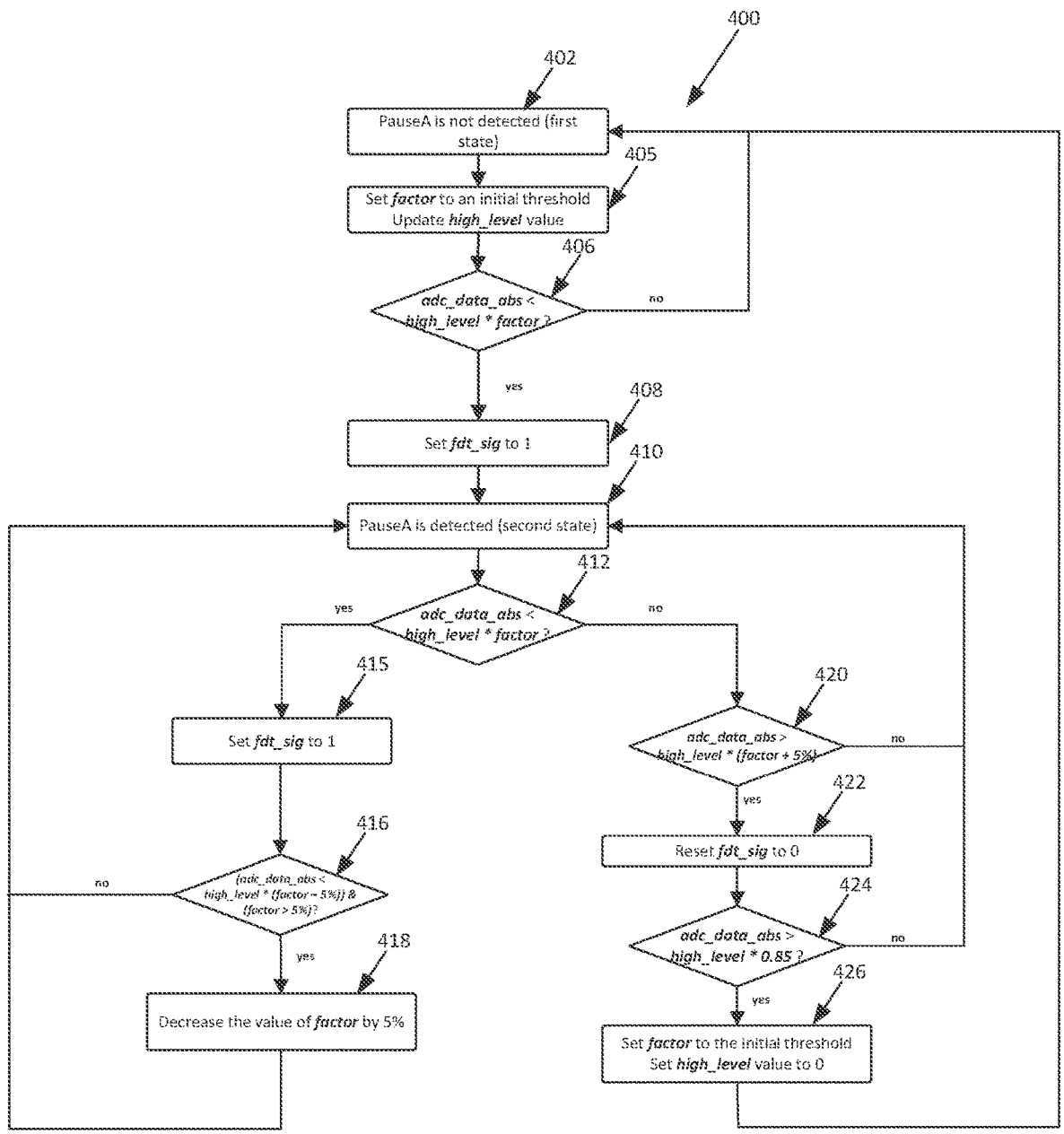
FIG. 4 is a flow diagram illustrating a method of detecting the end of the PauseA performed by the detection block of FIG. 3.

FIG. 4 is a flow diagram illustrating a method of detecting the end of the PauseA performed by the detection block of FIG. 3.

Referring to FIG. 4, method 400 begins at step 402 in a first state wherein PauseA is not detected in the received signal.

At step 405, initialization takes place for the detection of the end of PauseA in the received signal. During initialization, the value of the variable factor is set to an initial threshold, e.g., 70%. The initial threshold may be programed by the software and/or firmware. Method 400 also sets the value of high_level to be the amplitude of the received signal in the first state. In one embodiment, high_level corresponds to Hinitial as defined in the ISO/IEC 14443 standard.

At step 406, the amplitude of the received signal at a particular instant of time adc_data_abs is compared to the value of (high_level*factor).

If adc_data_abs is not less than the value of (high_level*factor), method 400 returns to step 402. However, if adc_data_abs is less than the value of (high_level*factor), it is indicated that PauseA is detected in the received signal. Consequently, the signal fdt_sig (the signal indicating the start of the frame delay time) is set to "1" at step 408. At step 410, method 400 enters a second state wherein PauseA is detected in the received signal.

During the second state, the amplitude of the received signal adc_data_abs is continuously monitored against the value of (high_level*factor) at step 412.

If adc_data_abs is less than the value of (high_level*factor), then the signal fdt_sig is set to "1" at step 415. At step 416, the amplitude of the received signal adc_data_abs is compared to the value of (high_level*(factor−5%)) and the value of factor is compared to 5%. If adc_data_abs is less than the value of (high_level*(factor−5%)) and the value of factor is larger than 5%, the value of factor is reduced by 5% at step 418. Otherwise, method 400 returns to step 410. Here the value of factor is reduced by a step of 5% if both adc_data_abs is less than the value of (high_level*(factor−5%)) and the value of factor is larger than 5%. In alternative embodiments, the value of factor is reduced by a different amount when the above given conditions are met.

On the other hand, if adc_data_abs is not less than the value of (high_level*factor) at step 412, then adc_data_abs is compared against the value of (high_level*(factor+5%)) at step 420. If adc_data_abs is not larger than the value of (high_level*(factor+5%)), method 400 returns to step 410. Otherwise, the signal fdt_sig is set to "0" at step 422.

At step 424, the amplitude of the received signal adc_data_abs is compared to the value of (high_level*85%). If adc_data_abs is not larger than the value of (high_level*85%), method 400 returns to step 410. However, if adc_data_abs is larger than the value of (high_level*85%), it is indicated that the end of PauseA is detected in the received signal. As a result, the value of high_level is set to "0" and the value of factor is set to the initial threshold at step 426. Method 400 then returns to step 402.

The following summarizes the key operating principles of the method described above.

The PauseA is detected only when adc_data_abs< (high_level*factor), whereas the end of the PauseA is detected is when adc_data_abs>(high_level*85%).

The value of high_level cannot be modified during the second state (i.e., PauseA is detected in the received signal).

The value of factor can only be reduced during the second state by a step of 5% when adc_data_abs<(high_level*(factor−5%)) provided that factor is not less than 5%. This ensures that the value of factor can be set as low as possible in order to work with every modulation index.

The signal fdt_sig is the signal used for the frame delay time. It is set to "1" when the PauseA is detected and reset to "0" when adc_data_abs>(high_level*(factor+5%)).

As provided herein, the method described above allows the precise detection of the end of PauseA to enable accurate frame delay time to be used between reception and transmission during communications. An adaptive threshold algorithm is implemented for the method described above allowing a robust detection of the end of PauseA regardless of the shapes of the received signals.

It should be noted that the above-mentioned embodiments illustrate rather than limit the invention, and that those skilled in the art will be able to design many alternative embodiments without departing from the scope of the appended claims. It is intended that the following claims cover all possible example embodiments.

In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A device for contactless communication comprising:
a near field communication (NEC) module being adapted to generate an electromagnetic carrier signal and to modulate the carrier signal according to data to be transmitted, said NFC module including a transmitter and a receiver;
an antenna coupled to said NFC module and driven by said NFC module with the modulated carrier signal;
an RF front end coupled between said NFC module and said antenna, the RF front end having an analog-to-digital converter for converting an incoming RF signal to a digital signal; and
a detection module coupled to receive the digital signal and provide the digital signal to said NFC module, said detection module being adapted to detect an end of a PauseA of the incoming RF signal by monitoring an amplitude of the digital signal;
wherein said detection module being adapted to detect an end of a PauseA of the incoming RF signal by monitoring an amplitude of the digital signal derived from the incoming RF signal includes detecting the PauseA in said digital signal by comparing the amplitude of said digital signal to a first level, wherein the PauseA is detected in the digital signal if the amplitude of said digital signal is less than said first level, wherein the first level equal Hinitial times a threshold, and wherein said threshold is decreased by 5% if the amplitude of the digital signal is less than Hinitial times the threshold−5% and the threshold is greater than 5%;
wherein said detection module being adapted to detect an end of a PauseA of the incoming RF signal by monitoring an amplitude of the digital signal derived from the incoming RF signal includes detecting the end of the PauseA in said digital signal by comparing the amplitude of said digital signal to a second level, wherein the second level equals Hinitial times 85%.

2. The device of claim 1, wherein said threshold is decreased by a first amount if the amplitude of said digital signal is less than Hinitial times (the threshold−5%) and said threshold is greater than 5%.

3. The device of claim 1, wherein the end of the PauseA is detected in said digital signal if the amplitude of said digital signal is greater than said second level.

4. The device of claim 1,
wherein said RF front end includes one or more analog-to-digital converters (ADC, A/D, or A-to-D) for converting the incoming RF signal to an in-phase digital signal and a quadrature digital signal; and
wherein said detection module further includes a combiner circuit, wherein said combiner circuit is adapted to combine the in-phase digital signal and the quadrature digital signal to generate said digital signal.

5. A method for detecting an end of a PauseA for near field communications (NFC) comprising:
receiving an incoming RF signal;
generating an in-phase signal and a quadrature signal from the incoming RF signal using an analog-to-digital converter;
combining the in-phase signal and the quadrature signal to generate a digital output signal; and
detecting an end of a PauseA of said incoming RF signal by monitoring an amplitude of said digital output signal, wherein said detecting an end of a PauseA of said incoming RF signal includes,
detecting the PauseA in said digital output signal by comparing the amplitude of said digital output signal to a first level; and
detecting the end of the PauseA in said digital output signal by comparing the amplitude of said digital output signal to a second level, wherein the end of the PauseA is detected in the digital output signal if the amplitude of the digital output signal is greater than Hinitial times 85%.

6. The method of claim 5, wherein the PauseA is detected in said digital output signal if the amplitude of said digital output signal is less than said first level.

7. The method of claim 6, wherein said first level equals Hinitial times a threshold.

8. The method of claim 7, further comprising decreasing said threshold by a first amount if the amplitude of said digital output signal is less than Hinitial times (the threshold−5%) and the threshold is greater than 5%.

* * * * *